(12) United States Patent
Kiedinger

(10) Patent No.: US 9,245,258 B2
(45) Date of Patent: Jan. 26, 2016

(54) SYSTEM AND METHOD OF ELECTRONIC INTERPERSONAL COMMUNICATION

(75) Inventor: Joseph M. Kiedinger, DePere, WI (US)

(73) Assignee: Prophit Marketing, Inc., Green Bay, WI (US)

(*) Notice: Subject to any disclaimer, the term of this patent is extended or adjusted under 35 U.S.C. 154(b) by 47 days.

(21) Appl. No.: 13/593,222

(22) Filed: Aug. 23, 2012

(65) Prior Publication Data

US 2013/0055110 A1 Feb. 28, 2013

Related U.S. Application Data

(60) Provisional application No. 61/526,455, filed on Aug. 23, 2011.

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC ... G06Q 10/107; G06Q 10/10; G06Q 10/109; H04L 12/581; H04L 12/1822; H04L 12/1813; G06F 3/0482; G06F 3/0481; H04N 7/15
USPC .......................................... 715/751, 752, 753
See application file for complete search history.

(56) References Cited

U.S. PATENT DOCUMENTS

| | | | |
|---|---|---|---|
| 4,893,819 A * | 1/1990 | Wright | 273/243 |
| 5,486,999 A | 1/1996 | Mebane | |
| 6,164,975 A | 12/2000 | Weingarden et al. | |
| 6,405,197 B2 * | 6/2002 | Gilmour | 707/805 |
| 6,618,723 B1 * | 9/2003 | Smith | |
| 7,092,952 B1 | 8/2006 | Wilens | |
| 7,133,660 B2 * | 11/2006 | Irlam | G06Q 10/107 370/230 |
| 7,272,634 B2 * | 9/2007 | Clement | G06Q 10/107 709/206 |
| 7,502,748 B1 | 3/2009 | Baldwin et al. | |
| 7,543,243 B2 * | 6/2009 | Schwartz et al. | 715/811 |
| 7,552,060 B2 * | 6/2009 | Vest | 705/1.1 |
| 7,720,855 B2 * | 5/2010 | Brown | 707/758 |
| 7,805,492 B1 * | 9/2010 | Thatcher | G06Q 10/107 709/206 |
| 7,966,373 B1 * | 6/2011 | Smith | G06Q 10/107 709/201 |
| 8,195,668 B2 * | 6/2012 | Drennan et al. | 707/748 |
| 8,429,411 B2 * | 4/2013 | Adams | G06Q 10/107 713/176 |
| 8,464,159 B2 * | 6/2013 | Refuah et al. | 715/744 |
| 8,478,728 B2 * | 7/2013 | Villa et al. | 707/666 |
| 8,514,226 B2 * | 8/2013 | Zafar et al. | 345/440 |
| 8,578,171 B2 * | 11/2013 | Adams | G06Q 10/107 713/176 |

(Continued)

OTHER PUBLICATIONS aboutmecard,com web pages from Aug. 11, 2009 to Mar. 17, 2011 accessed from the Internet Archive site on Dec. 9, 2014.*

(Continued)

*Primary Examiner* — Jessica Chuang
(74) *Attorney, Agent, or Firm* — Andrus Intellectual Property Law, LLP

(57) ABSTRACT

A system and method of electronic interpersonal communication includes receiving a selection of a recipient for communication. A user profile for the selected recipient is accessed. The user profile includes a plurality of communication traits of the selected recipient. A graphical display presents at least one communication trait of the selected recipient from the user profile. An electronic communication to the selected recipient is received. The electronic communication is sent to the selected recipient.

16 Claims, 4 Drawing Sheets

(56) References Cited

U.S. PATENT DOCUMENTS

| | | | | |
|---|---|---|---|---|
| 8,661,002 B2* | 2/2014 | Smith | | G06Q 10/107 707/614 |
| 8,682,988 B2* | 3/2014 | Du | | 709/206 |
| 8,754,848 B2* | 6/2014 | Holzer | | G06Q 90/00 345/156 |
| 8,984,074 B2* | 3/2015 | Monaco | | G06Q 10/107 709/206 |
| 8,990,323 B2* | 3/2015 | Hein | | G06Q 10/10 705/319 |
| 2003/0149572 A1* | 8/2003 | Newton et al. | | 705/1 |
| 2004/0101127 A1 | 5/2004 | Dezonno et al. | | |
| 2004/0130571 A1* | 7/2004 | White | | 345/751 |
| 2004/0135816 A1* | 7/2004 | Schwartz et al. | | 345/811 |
| 2004/0267816 A1* | 12/2004 | Russek | | 707/104.1 |
| 2005/0125544 A1* | 6/2005 | Zhao | | 709/227 |
| 2006/0059130 A1* | 3/2006 | Weiss et al. | | 707/3 |
| 2006/0143228 A1 | 6/2006 | Odio-Paez et al. | | |
| 2006/0288219 A1* | 12/2006 | Adams | | G06Q 10/107 713/176 |
| 2007/0250349 A1 | 10/2007 | Tieger | | |
| 2007/0252812 A1 | 11/2007 | Keahey | | |
| 2008/0015878 A1* | 1/2008 | Feng et al. | | 705/1 |
| 2008/0052272 A1* | 2/2008 | Altaf | | G06F 17/273 |
| 2008/0140467 A1 | 6/2008 | Hull | | |
| 2008/0172461 A1* | 7/2008 | Thattai et al. | | 709/204 |
| 2008/0172464 A1* | 7/2008 | Thattai et al. | | 709/205 |
| 2008/0318563 A1* | 12/2008 | Ross et al. | | 455/418 |
| 2009/0012988 A1* | 1/2009 | Brown | | 707/102 |
| 2010/0077032 A1* | 3/2010 | Drennan et al. | | 709/206 |
| 2010/0080412 A1* | 4/2010 | Zafar et al. | | 382/100 |
| 2010/0125530 A1* | 5/2010 | Terrill et al. | | 705/319 |
| 2010/0235776 A1* | 9/2010 | Brown | | 715/772 |
| 2011/0179116 A1* | 7/2011 | Solomon et al. | | 709/204 |
| 2011/0191433 A1* | 8/2011 | Du | | 709/206 |
| 2011/0214046 A1* | 9/2011 | Haberman et al. | | 715/202 |
| 2011/0291933 A1* | 12/2011 | Holzer et al. | | 345/167 |
| 2011/0298701 A1* | 12/2011 | Holzer et al. | | 345/156 |
| 2012/0198005 A1* | 8/2012 | DeLuca | | 709/206 |
| 2012/0290660 A1* | 11/2012 | Rao et al. | | 709/204 |
| 2013/0337768 A1* | 12/2013 | Zafar et al. | | 455/405 |
| 2014/0089081 A1* | 3/2014 | Yruski et al. | | 705/14.41 |

OTHER PUBLICATIONS

About Me Card Profile, by About Me International LLC and Life Discoveries Inc., 2009.

The Flag Page Manual, by Life Discoveries Inc., 2005.

* cited by examiner

SYSTEM AND METHOD OF ELECTRONIC INTERPERSONAL COMMUNICATION

CROSS-REFERENCE TO RELATED APPLICATION

The present application is based on and claims priority to U.S. Provisional Patent Application Ser. No. 61/526,455 filed Aug. 23, 2011, which is hereby incorporated by reference in its entirety.

BACKGROUND

In business, interpersonal communication is at the heart of almost any undertaking. Interaction with employees, customers, suppliers, or clients requires clearly and effectively conveying a message to a recipient in a manner that will be understood and effectively received by that recipient. In an increasingly national and international business environment, less interpersonal communication is conducted face to face wherein the sender can quickly interpret non-verbal communication clues and adjust a communication style or message to the recipient. Instead, more communication is conducted over electronic communication platforms where non-verbal cues are unavailable. Additionally, communication style and patterns typically have to be learned over the course of many interpersonal interactions before a sender and recipient are comfortable with one another to a degree that is effective so their interpersonal communication goals can be effectively achieved. When a new communication sender or recipient is thrown into the mix of experienced communication partners, that new communication partner is at a communication disadvantage that can only be overcome by learning through the above-mentioned interpersonal exchanges.

BRIEF DISCLOSURE

A method of electronic interpersonal communication includes receiving a selection of a recipient for communication. A user profile for the selected recipient is accessed. The user profile includes a plurality of communication traits of the selected recipient. A graphical display presents at least one communication trait of the selected recipient from the user profile. An electronic communication to the selected recipient based upon the presented at least one communication trait is received. The electronic communication is sent to the selected recipient.

A system for electronic interpersonal communication includes a sender workstation, a receiver workstation, and a communication network that communicatively connects the sender workstation to the receiver workstation. A storage medium stores a plurality of user profiles. Each user profile of the plurality includes a plurality of communication traits. A microprocessor operates computer readable code such that the microprocessor causes the sender workstation to receive a selection of a recipient, receive an identification of the selected recipient, and access a user profile of the selected recipient on the storage medium. A graphical display presents the user profile of the selected recipient and presents the plurality of communication traits. The graphical display provides an electronic communication interface. The electronic communication interface receives an electronic communication to the selected recipient so that the electronic communication is based upon the plurality of communication traits and the electronic communication is provided from the sender workstation to the receiver workstation across the communication network.

A method of electronic interpersonal communication includes providing a plurality of user profiles. Each user profile of the plurality is created by receiving the identification of a plurality of motivations of a user. A motivation group is identified from the identified plurality of motivations. At least one rule of engagement is received from the user based upon the identified motivation group. At least one user support term is received from the user based upon the identified plurality of motivations. At last one user expectation based upon the received at least one user support term is received. The user profile is created to include at least one rule of engagement, at least one user support term, and at least one user expectation. A selection of a recipient for communication from the plurality of user profiles is received. A user profile for the selected recipient is accessed. A graphical display presents the at least one rule of engagement, at least one user support term and at least one user expectation of the selected recipient from the user profile. An electronic communication to the selected recipient based upon the presented at least one rule of engagement, user support term, and expectation is received. The electronic communication is sent to the selected recipient

DETAILED DISCLOSURE

Figure 1:
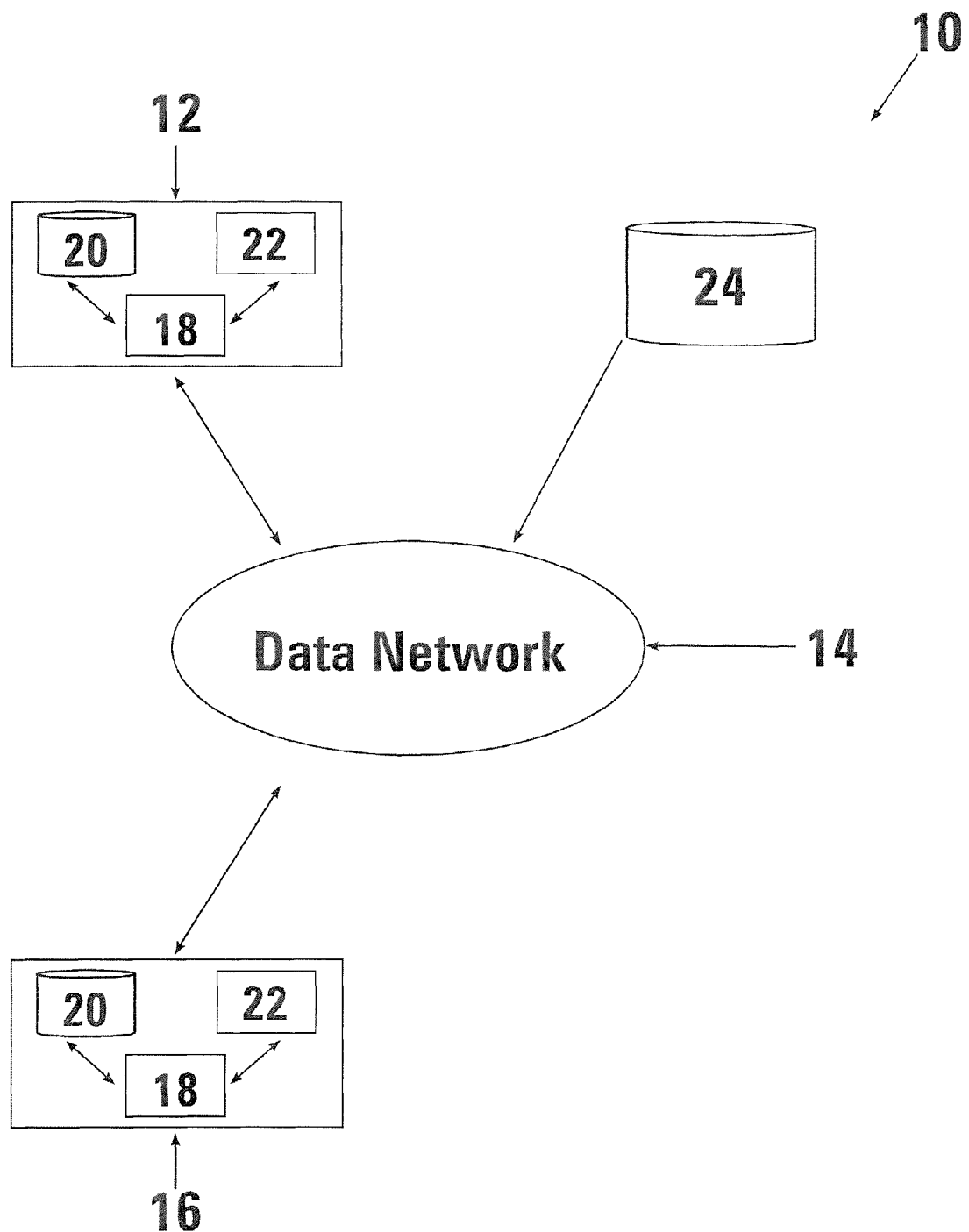
FIG. 1 is a system diagram of a system for interpersonal communication.

FIG. 1 depicts an interpersonal communication system 10 that includes a sender workstation 12 that is communicatively connected by a data network 14 to a receiver workstation 16.

In exemplary embodiments, the sender workstation 12 and the receiver workstation 16 may be any of a variety of electronic communication devices. These communication devices can exemplarily include desktop, laptop, or tablet personal computers, cell phones, smart phones, or the like. The data network 14 can be any of a variety of wired or wireless communication networks, including local area networks, wide area networks, cellular, or WiFi communication networks.

In an embodiment of the sender workstation 12, the sender workstation 12 includes a processor 18 that can be a microprocessor or controller recognized by one of ordinary skill in the art to be suitable for the purposes and functions as disclosed herein. The processor 18 is connected to a computer readable medium 20. A computer readable medium 20 stores computer readable code in the form of software or firmware programs or modules. The computer readable code is executable by the processor 18 such that upon execution, the processor performs a series of logical steps as defined in the computer readable code to carry out the functions of the processor 18 and sender workstation 12 as disclosed herein. The computer readable medium 20 further stores data that is used by the processor 18 in executing the computer readable code. These data stored on the computer readable medium 20 can include the user profiles as described in further detail herein.

The sender workstation 12 further includes a graphical display 22 that is communicatively connected to the processor 18 and operated by the processor 18. The graphical display 22 is configured to present one or more graphical user interfaces (GUI) that facilitate the interaction between a user and the sender workstation 12.

The receiver workstation 16 similarly may include a processor 18, computer readable medium 20, and a graphical display 22 that are operable to present communication to the recipient. It is understood that in some embodiments, the sender workstation 12 and the receiver workstation 16 may be interchangeable, such that a communicative exchange back and forth between the two communication parties can be conducted in the manner as disclosed herein. Alternatively, the receiver workstation 16 may be any of a variety of communication devices as recognized by one of ordinary skill in the art capable of presenting the visual, textual or audible communication to the receiver from the sender. In one such exemplary and non-limiting embodiment, the receiver workstation is a "dumb" phone, capable only of sending and receiving audible communication.

In still further embodiments, the sender workstation 12 and/or the receiver workstation 16 can be communication devices that access a remotely located server (not depicted) across data network 14 such as with an Internet browser to complete the transfer of electronic communications. One non-limiting example of this embodiment includes a sender or a receiver that uses a third party web-based email client to exchange, send, or receive electronic communications. In such embodiment, the receiver workstation 16 (or sender workstation 12) accesses a server of the email client to facilitate such transfer of electronic communications.

As will be described in further detail herein, the interpersonal communication system 10 includes a plurality of user profiles that are made up of specific information regarding each of the profiled users. In some embodiments, these user profiles could be locally stored on the computer readable medium 20 of the sender workstation 12.

In still further embodiments, the interpersonal communication system 10 can operate in a distributed format such that a separate computer readable medium 24, exemplarily in connection with a server, stores the user profiles and the computer readable code such as described above for use by the sender workstation 12 in developing an interpersonal communication to be transmitted across the data network 14 to the receiver workstation 16. In such an embodiment, the sender workstation may access the computer readable medium 24 through operation of other locally stored computer software, exemplarily an internet browser.

Figure 2:
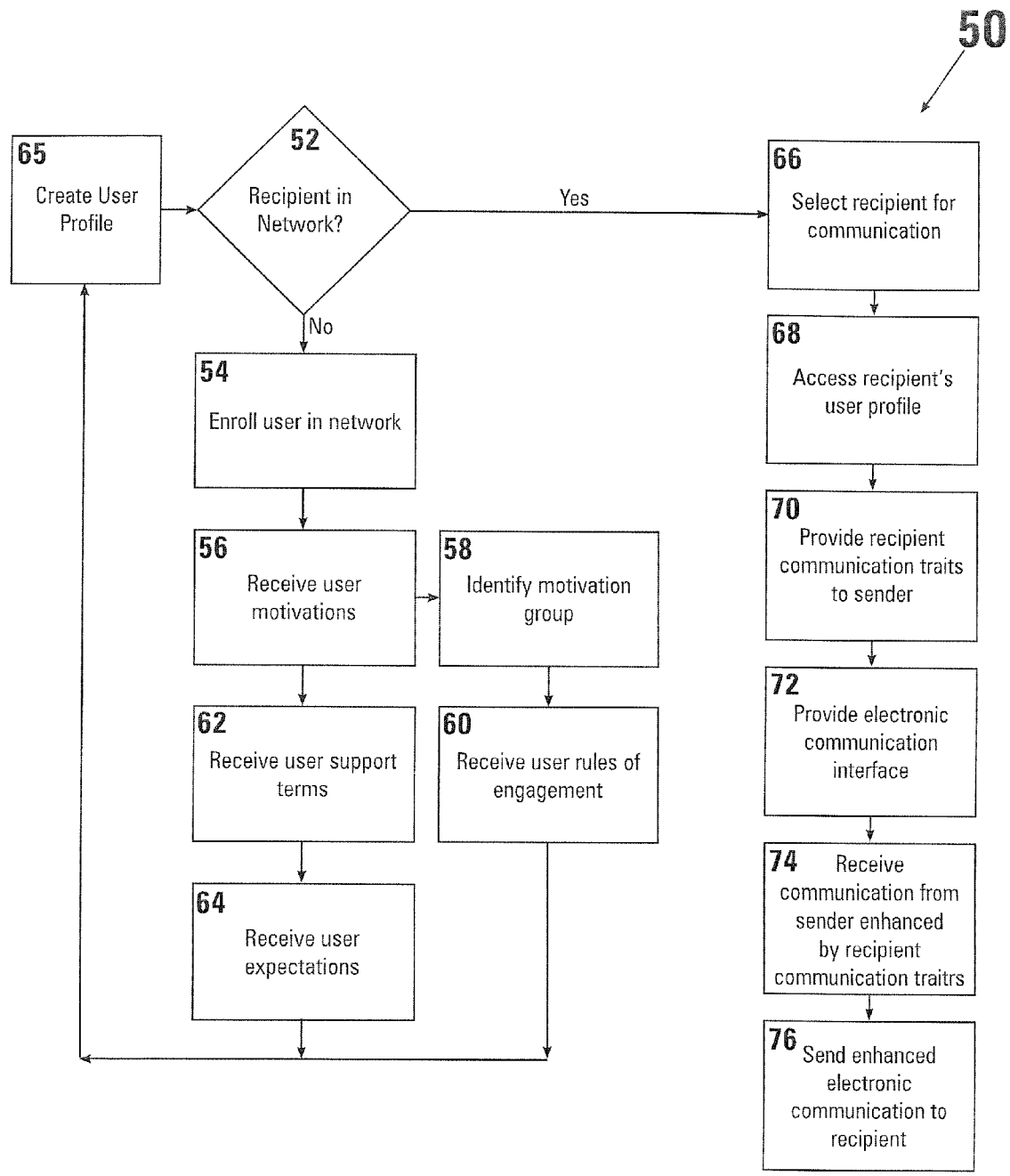
FIG. 2 is a flow chart that depicts an embodiment of a method for interpersonal communication.

FIG. 2 is a flow chart that depicts an embodiment of a method for interpersonal communication. It is understood that the method 50 can be embodied in the form of functions carried out across an interpersonal communication system, such as system 10 in FIG. 1, or alternatively can be embodied on a computer readable medium in computer readable code, such that upon execution by a processor of the computer readable code, the processor operates a sender workstation to prompt the use of the personal communication system according to the method 50.

The method 50 begins with a sender identifying a recipient to which the sender wants to send an interpersonal communication. It is to be understood that in alternative embodiments, the sender may identify a plurality of recipients to which the sender will send an interpersonal communication. At 52, the determination is made whether or not the recipient is registered in the communication network. That is, a determination is made at 52 whether or not a user profile exists in the network for the intended recipient. In an alternative embodiment, the sender is presented with a list of recipients for whom a user profile exists.

If the recipient is not already in the communication network, then at 54, the recipient must be enrolled in the network. Enrollment in the communication network entails the user providing information about the user's own communication style and preferences. The enrollment of the user in the communication network includes collecting the user's basic information and contact information that can be used within the communication network in order to deliver messages and other forms of interpersonal communication to the user. This basic information can include a telephone number, email address, instant message handle, or other electronic communication address. Then the user is prompted through a series of questions and exercises as described in further detail herein in order to identify the communication traits of that particular user.

At 56, the system receives a predetermined number of user motivations. In one embodiment, the enrolling user is presented with a list of motivation words, from which the user selects a predetermined number. In one exemplary embodiment, the user rates each of the listed motivations in terms of importance to the user, and selects the top five most important motivations to that user. However, it is understood that a variety of ways for selection of motivations may be used, as well as the total number of motivations received from the enrolling user. Table 1 is an exemplary list of motivations that may be presented to the enrolling user.

TABLE 1

| USER MOTIVATIONS | | | |
| --- | --- | --- | --- |
| Competent | Consistent | Witty | Dry sense of humor |
| Steady | Sympathetic | Low Key | Easygoing |
| Calm | Patient | Peaceful | Avoids conflict |
| The easy way | Good listener | Watch people | Persistent |
| Perfectionist | Idealistic | Precise | Unique |
| Creative | Artistic | Musical | Organized |
| Economical | Thoughtful | Serious | Neat |
| Sensitive | Faithful | Stay in background | Deep thinker |
| Strong willed | Bold | A born leader | Tons of confidence |
| Self sufficient | Goal setter | Moves quick to action | Independent |
| Unemotional | Life of the party | Never a dull moment | Enthusiastic |
| Optimistic | Inspirational | Flash | Good on stage |
| Great sense of humor | Fun | Loves people | Cheerful |
| Warm | Curious | Sincere at Heart | Thrives on engagement |

Each of the motivations from which the enrolling user can select are associated with a motivation group. The motivation group is a category or subset of the motivations presented to the user that can be used to begin to generalize communication traits of the enrolling user.

In one embodiment, the motivation groups are reflective of a communication nature of the user which exemplarily be categorized as "hard natured," "soft natured", or "balanced natured". In an alternative embodiment, the motivation groups can be categories of "countries" of related motivations. In one embodiment, the motivations can be divided into "Control," "Peace," "Perfect," and "Fun" countries. In still a further embodiment, the motivations can be divided into motivation actions. In this embodiment, the motivations can be divided into "People Motivations," "Task Motivations," "Creation Motivations," "Leading Motivations," and "Showman Motivations".

In some embodiments, the user may fall into more than one motivation group. In that event, a dominant motivation group is identified. This identification of the dominant motivation group can be determined in a variety of ways. In one exemplary embodiment, at 58, one or more motivation groups are identified for the enrolling user. The user may fall into one or more of each of the motivation groups as identified above. Furthermore, based upon the number of received user motivations at 56, the enrolling user may fall into multiple motivation groups. In one non-limiting embodiment, if at 56, five user motivations are exemplarily received, then any motivation group within which two or more of the receiver motivations falls, would be identified as the dominant motivation group for the user. Additional motivation groups at 58 besides a dominant motivation group may further be identified as secondary motivation groups based upon the relevance or strength attributed to each of the received motivations by the user.

The motivation groups identified at 58 for the enrolling user are used at 60 to receive rules of engagement for communication with the enrolling user. The rules of engagement define the manner in which interpersonal communication content is conveyed. In one embodiment, the "rules of engagement" the users are automatically selected based upon the user's dominant and secondary motivation groups. Alternatively, the user is presented with selections for the rules of engagement based upon the user's dominant and second motivation groups.

In such an embodiment, the user may be presented with a selection of a predetermined number of "dos" and a separate list of a predetermined number of "don'ts" which the enrolling user selects positive and negative rules of engagement. In such an embodiment, the rules of engagement provide instructions from the user to potential senders on how to convey information, namely how to or how not to convey such messages. In a non-limiting example, if the user is identified to be in the "peace country" motivation group, the user may be presented with the "dos" of: "Let's figure this out together," "you can count of me," "take responsibility," "tell me how you feel," "be positive," "let's work together to achieve our goals," "do your job with pride," "work hard and have fun," "ask me for help," "bring ideas when you bring me your problems," and "give me the facts." The user may then be prompted to select a predetermined number of the presented "peace country" "dos." The number of "dos" rules of engagement received from the user may be dependent upon the determined motivation groups of the user from 58. In such an embodiment, the user may be prompted to select more rules of engagement from the determined dominant motivation group, while fewer rules of engagement are selected based upon identified secondary motivation groups. Similar to the above example, two rules of engagement may be received from the user from an identified dominant motivation group, while on additional rule of engagement is selected from lists based upon any identified secondary motivation group.

Similar to that described above with respect to the "dos" rules of engagement, the "don'ts" rules of engagement are similarly received from the user. In the example where at 58 the enrolling user is identified to have the dominant motivation group of "peace country," the user may be presented with "don'ts" results of engagement that include "don't be dishonest," "don't beat around the bush," "don't tell me what I can't do," "don't make excuses," "don't interrupt me/others," "don't waste time," "don't hesitate to ask for help," "don't give less than 100%," "don't short cut a process," and "don't disrespect your teammates." The "don'ts" rules of engagement are received from the user in a similar manner as described above with respect to the "dos."

In addition to using the received user motivations from 56 to identify the motivation groups at 58 and "Rules of Engagement" at 60 of the enrolling user, the received user motivations are used to elicit support terms from the enrolling user. These support terms are received from the user at 62. A predetermined number of support terms are associated with each motivation. Therefore, when the user motivations are received at 56, the user can then be presented with the plurality of predetermined support terms that are associated with each of the received user motivations. The purpose of the support terms is to further clarify and highlight the enrolling user's perception and personal interpretation of the provided user motivation. The support terms thus identify a refined articulation of the concepts that motivate the user.

In a non-limiting example, if the enrolling user selects "acceptance" as a user motivation, then the user may be presented with three different support terms that begin to clarify what the selected motivations mean to the enrolling user. As one example, if the motivation "competent" was selected, the enrolling user is presented with three support terms, such as: "ability", "effort", and "know how." Thus, a response is solicited from the enrolling user to better explain what the user means by a selected motivation of "competent." At 62, a support term is received for each of the motivations received at 56.

At 64, the received support terms are further refined into user expectations which are received at 64. In an exemplary embodiment, the enrolling user is presented with six expectation statements based upon each of the support terms received at 62. The presented expectation statements seek to further refine the enrolling user's perception of each of the received support terms into an expression of how the user wants to communicate or collaborate.

To continue the above example, if the motivation "competent" was received from the enrolling user at 56, and then the support term "ability" was received from the enrolling user at 62, then at 64 the enrolling user is presented with six further expectation statements to clarify the user's perception of the word "ability." In one example, the user may be presented with the expectation statements called "I can do it. No problem.", "Trust me, I can do this.", "I'll get the job done right.", "I know how to do it.", "I have mad skills.", and "What you can expect from me."

The user selects the expectation statement that most clearly represents the support term "ability" to the user and the selected expectation statement is received at 64. After the user motivations, user support terms, user expectations, and rules of engagement have all been received, the user enrollment in the network is complete and a user profile is created at 65. The enrollment process takes the enrollee step by step through an introspective analysis to help to identify the communications styles to which the user is most receptive. As described above with respect to FIG. 1, the newly created user profile can be stored in computer readable medium 20 or 24.

Returning to 52, the intended recipient of the interpersonal communication is now enrolled in the network and thus the method 50 proceeds to 66 wherein the communication sender selects the recipient for an interpersonal communication. With the selection of the recipient within the network, the communication sender is permitted access to at least a portion of the user profile for the recipient at 68. The user profile for the recipient was previously created at 65 from the responses and information that are received from the recipient during enrollment in the network as described above.

Thus, the user profile accessed at 68 includes all of the received communication traits of the enrolled user.

At 70, all or some of the recipient's user profile, including the recipient's communication traits, is presented to the communication sender, as will be described in further detail herein. In one embodiment, the communication sender is presented with a variety of the recipient's communication traits in a graphical user interface presented on a graphical display. The communication traits may include in embodiments the recipient's support terms, expectations, and rules of engagement.

Figure 3:
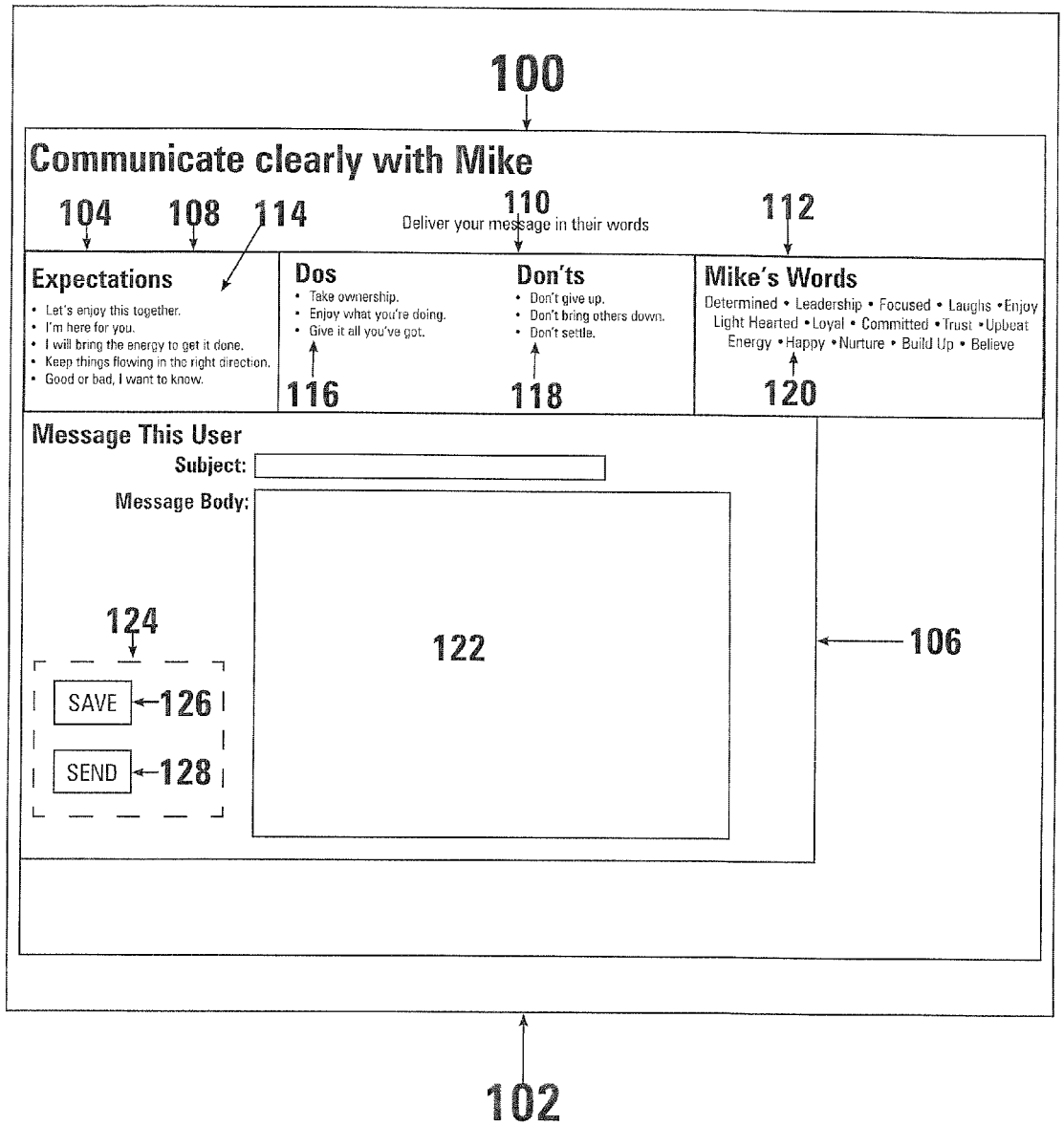
FIG. 3 is an exemplary embodiment of a graphical user interface for use in interpersonal communication.

The graphical user interface which will be described in further detail herein, with respect to FIG. 3, provides the recipient's communication traits to the sender at 70 and may also concurrently provide an electronic communication interface at 72. The electronic communication interface may be any of a variety of electronic communication platforms such as, but not limited to, email, short message service (SMS), instant messaging chat, VOIP voice communication, video conferencing, blogging or micro-blogging editors, web page design editors, or word processors.

Through the electronic communication interface, a communication from the sender is received at 74 that is intended for the recipient. The communication that is received at 74 from the sender is enhanced by the recipient communication traits that are provided to the sender through the graphical user interface. Thus, as the sender formulates the electronic communication, the sender is able to refer to the words and phrases that have been provided by the recipient as communication concepts and qualities that resonate particularly well or particularly poorly with the recipient. In this manner, the sender is able to create an electronic communication specifically directed to the recipient that is tailored to the communication style and preferences of the recipient.

In one exemplary embodiment, each of the communication traits provide an insight into effective communication with the receiver. The support terms provide words that motivate or resonate with the receiver. The expectations explain how the receiver effectively communicates or collaborates. The rules of engagement provide a framework of communication strategies to use or to avoid to effectively communicate with the receiver.

Once the enhanced electronic communication has been received from the sender at 74, the enhanced electronic communication is sent to the recipient at 76.

FIG. 3 depicts an exemplary embodiment of a graphical user interface 100 that can be presented on a graphical display 102. It is understood that the graphical user interface (GUI) 100 can take a variety of forms as would be recognized by one of ordinary skill in the art and that the GUI 100 as shown in FIG. 3 is but one non-limiting example.

The GUI 100 is designed to facilitate the actions of 70-76 in the method 50 described above in detail with respect to FIG. 2. Namely, the GUI 100 provides the communication traits of an intended recipient to the communication sender, the GUI 100 provides an electronic communication interface, receives a communication from the sender, and facilitates the transmission of the electronic communication to the recipient.

In the GUI 100 of FIG. 3, a hypothetical recipient "Mike" has been selected to receive a communication. A communication traits region 104 of the GUI 100 presents one or more communication traits of the selected recipient, Mike. The GUI 100 further includes an electronic communication interface 106. In the embodiment depicted in FIG. 3, the electronic communication interface 106 is an email based electronic communication interface. While the foregoing description will exemplarily focus on email based electronic communication, it is to be understood that the use of email is merely exemplarily and alternative embodiments may use one or more other forms of electronic communication in addition to, or instead of, email. Exemplarily these other forms of electronic communication can include SMS, VOIP (such as available from Vonage), instant messaging chat (such as available from AOL Instant Messenger), video conferencing (such as available from Skype), blogging or micro-blogging editors, web page editors, or word processing.

As will be apparent with the further details provided herein, some embodiments of the methods as disclosed herein are better adapted for certain types of electronic communication interfaces, while alternative embodiments are better suited to other electronic communication interfaces. In one non-limiting example, individually directed forms of communication such as email, SMS, VOIP, video call, or instant messaging chat may be better suited for use with embodiments exemplarily depicted as method 50 presented in FIG. 2 that directs communication to a particular individual, while communication platforms directed to a wider or mass audience, such as blogging, micro-blogging, web page editing, word processing, and group emails, chats, or video conferencing may be more suited to embodiments of the method described in conjunction with FIG. 4 directed to communication to a particular group of individuals.

Referring back to the GUI 100 of FIG. 3, the communication trait region 104 is divided into sub-regions, including a user expectation region 108, a rules of engagement region 110, and a support term region 112. Each of these separate regions in the communication traits region 104 clearly presents the different types of identified communication traits of the selected recipient, Mike, to the communication sender.

In the user expectations region 108, a plurality of expectations 114 are presented. the plurality of user expectations 114 were previously provided by the recipient when the recipient enrolled in the network as described above with respect to FIG. 2. Thus, when the sender is preparing an interpersonal communication to the selected recipient, Mike, the sender is able to reference Mike's own self-provided expectations for communication and collaborative work.

Next, in the rules of engagement sub-region 110, both the received dos 116 and don'ts 118 for communication with the selected recipient, Mike, are presented to the communication sender. Thus, as the communication sender crafts the communication to be sent to Mike, the sender can refer to the concepts and use communication strategies that will be positively received by Mike, while avoiding those concepts and communication strategies that will be negatively received by Mike. Therefore, the communication sender is able to follow Mike's rules of engagements in crafting an interpersonal communication to Mike.

In the support terms sub-region 112, the support terms 120 that were received during Mike's enrollment in the network are listed. The support terms provide further words and concepts that will particularly motivate or resonate with Mike. Therefore, the sender is able to communicate with Mike in Mike's own words and chosen communication vocabulary.

The communication interface region 106 is exemplarily depicted as an email electronic communication interface. However, it will be recognized by one of ordinary skill in the art that any of a variety of electronic communication platforms may be used in embodiments of the electronic communication interface region 106. In an alternative embodiment, the electronic communication interface region 106 includes a plurality of electronic communication platforms and the communication sender is able to select between a variety of electronic communication platforms upon which to communicate with the selected recipient.

In embodiments of the electronic communication interface 106 that utilize email, a text editing region 122 permits the communication sender to compose a text-based communication to the selected recipient, Mike. GUI buttons 124 provide operations or controls to the communication sender. These exemplarily include a save button 126 and a send button 128. As recognized by one of ordinary skill in the art, the communication sender can send the completed textual communication to the selected recipient by selecting the send button 128, which will initiate transmission of the communication to the recipient, as described above with respect to FIG. 1.

It is to be recognized that the electronic communication interface region 106 will be adapted in embodiments to the actual communication platform used. In an alternative example using audio communication, the electronic communication interface region 106 can provide audio transmission controls and the sender uses the presented communication traits to formulate the enhanced communication on the fly.

Figure 4:
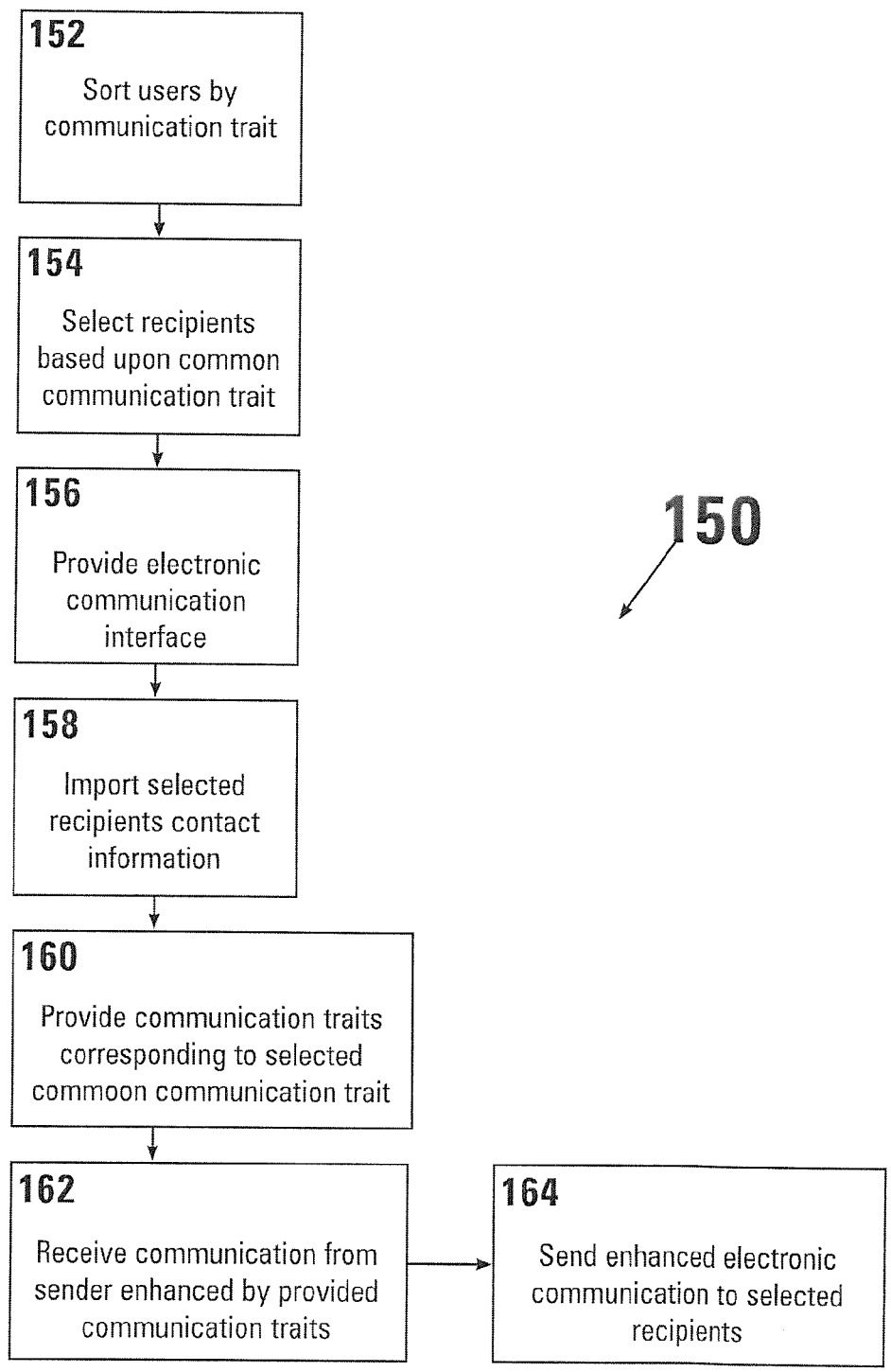
FIG. 4 is a flow chart that depicts an alternative embodiment of a method of interpersonal communication.

FIG. 4 depicts an alternative embodiment of a method of interpersonal communication 150. The method 150 is an exemplary embodiment of a method that is adapted to crafting an interpersonal communication to a group of recipients rather than a specific individual or individuals. While not depicted in FIG. 4, it is understood that in embodiments users enroll in the communication network as described above with respect to FIG. 2. The users are all enrolled in the network, thus each potential recipient has a user profile as described above. At 152, the users are sorted by one or more communication traits. Such sorting can be done within a database of the stored user profiles, such as a computer readable medium 20 or 24, as exemplarily depicted in FIG. 1.

At 154, the communication sender selects a group of recipients based upon a common communication trait or traits. In a non-limiting example, the communication sender may select to send a communication to all of the users that have been identified as residing in the "peace country" motivation group or the "hard nature" motivation group, as described above. In still further exemplary embodiments, the communication sender may select to send a communication to all users that chose "ability" as a support term.

Thus, the selected recipients for the interpersonal communication are selected based upon their communication style or communication traits rather than the individuals themselves or other means of selecting recipients, such as a customer list or a department directory. In this manner, the recipient list can be tailored to the message, rather than the other way around. Thus, when a particular message has been identified such as forwarding a motivational article, web page, story, offering a particular incentive, or announcing a particular promotion, the recipients to which that communication is mostly likely to resonate can be selected to receive that communication.

Thus, when general communication traits, such as motivation groups are used, one communication can be tailored to "hard nature" recipients, one communication can be targeted to "soft nature" recipients, and a third communication can be sent to "balanced nature" recipients. In a further example, different interpersonal communications can be written to convey the same information, but in a communication style directed to each of the identified motivation group "countries." Therefore, all of the intended recipients receive the same basic information but the basic informative communication can be tailored to a communication style that will better resonate with each group of recipients.

In one exemplary embodiment, a company wants to announce a new office location to all of the employees. Two different announcements can be sent out: one highlighting the great people working at the new office, the location itself, and how the location will better serve customers that will be sent to "soft nature" employees, while a second announcement highlighting the efficiencies that will be gained and new market opportunities will be sent to "hard nature" employees.

In a still further embodiment, the communication sender can select a communication trait such as a specific support term selected by the user. In this manner, the communication sender can target a highly selective group of recipients based upon a specific support term, exemplarily "ability" as discussed above. The interpersonal communication message can then be tailored to recipients to whom that support term resonates. In one non-limiting example, such a communication might announce an educational opportunity in which employees can build skills or expertise.

At 156, an electronic communication interface is provided, such as exemplarily described above with respect to FIG. 3. At 158, the contact information for the recipients selected at 154 are imported into the electronic communication interface provided at 156. Further at 160, the electronic communication interface provides, at 160, communication traits corresponding to the selected common communication trait. The communication traits provided at 160 can exemplarily include support terms, user expectations, and rules of engagement that are associated with or correspond to the common communication trait selected at 154. In an alternative embodiment, an indication of all the communication traits represented by the selected recipients are presented. In one such embodiment, an indication of prevalence of a particular communication trait among the selected recipients is presented.

At 162, the electronic communication interface receives a communication from the sender that is enhanced by the provided communication traits. Thus, while the communication sender is crafting the communication to be sent to the selected recipient, the communication sender can incorporate one or more of the provided communication traits into the communication which thus creates an interpersonal communication that will be more readily accepted by the selected recipients that all exhibit the same common communication trait.

Finally, at 164, the enhanced electronic communication is sent to the selected recipients. The enhanced electronic communication will be sent depending upon the electronic communication platform used in carrying out the method 150 as will be recognized by one of ordinary skill in the art. In a still further embodiment, the enhanced electronic communication may be sent to a preferred form of electronic communication as selected and determined by each of the recipients, therefore while one recipient may prefer to receive text messages, another recipient may prefer an email and thus each of the selected recipients receives the electronic communication in a form that is preferred by that recipient.

In a still further embodiment, the user profile facilitates effective interpersonal communication between an employer and an employee in a review setting. Such embodiments can create a respectful engagement between employer and employee and when formed on a scheduled or regular basis, can facilitate communication between employee and employer.

In this embodiment, the review seeks to make employer leadership more effective by measuring the leadership in how well the leader supports the unique motivation and communication traits represented in the user profile and as explained above. In such a review, the employer goes through each of the communication traits with the employee and receives a rating from the employee on the leadership ability of the employer to satisfy or create an environment that supports each communication trait. In some embodiments, the rating solicited from the employee is a numeric rating while in other embodiments, such rating could be a qualitative, strongly agree, agree, neutral, disagree, strongly disagree type rating. The review process is continued by following up with the employee regarding any communication traits that are identified as being below a predetermined rating threshold. By focusing on those motivations and communication traits that the employee feels are not being facilitated, the employer can receive a more expository explanation of particular issues in the workplace. The employee is also solicited for an explanation of how the employer can better facilitate the employee's motivation and communication traits.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method of electronic interpersonal communication, the method comprising:
   enrolling a first user by:
      receiving at least one rule of engagement from the first user, wherein the at least one rule of engagement comprises an instruction selected by the first user defining a preferred manner to convey messages to the first user;
      receiving at least one support term from the first user, wherein the at least one support term comprises a word or phrase selected by the first user as being motivational in communication;
      receiving at least one expectation from the first user, wherein the at least one expectation is a word or phrase selected by the first user as expressing how the first user wants to collaborate; and
      creating a first user profile uniquely associated to the first user and comprising a plurality of communication traits of the first user comprising the received at least one rule of engagement, at least one support term, and at least one expectation;
   receiving a selection, from a second user, of the first user as of a recipient for communication;
   accessing the first user profile for the selected recipient, the first user profile comprising the plurality of communication traits comprising the at least one rule of engagement, the at least one support term, and the at least one expectation, of the first user;
   presenting on a graphical display the plurality of communication traits including the at least one rule of engagement, the at least one support term, and the at least one expectation from the first user profile to the second user;
   receiving, at an electronic communication interface presented on the graphical display concurrently with the plurality of communication traits, an electronic communication to the first user;
   enhancing an effectiveness of the electronic communication to the first user by incorporating at least one of the at least one rule of engagement, the at least one support term, and the at least one user expectation in the electronic communication; and
   sending the electronic communication to the first user.

2. The method of claim 1, wherein the electronic communication interface presents the plurality of communication traits of the first user.

3. The method of claim 1, wherein enrolling the first user further comprises:
   presenting the first user with a plurality of user motivations;
   receiving at least one selected user motivation from the plurality of user motivations;
   identifying a motivation group from the at least one selected user motivation;
   presenting the first user with a plurality of rules of engagement for selection based upon the identified motivation group; and
   presenting the first user with a plurality of user expectations for selection based upon the received at least one support term.

4. The method of claim 3 further comprising:
   sorting a plurality of user profiles by identified motivation group in each of the user profiles;
   selecting a group of recipients, the group of recipients including the first user, based upon a common motivation group in user profiles of the group of recipients; and
   presenting a plurality of communication traits associated with the common motivation group in a electronic communication interface which receives the electronic communication from the second user;
   wherein the received electronic communication to the first user is further to the selected group of recipients and the received electronic communication is based upon at least one communication trait of the plurality of communication traits associated with the common motivation group.

5. The method of claim 1, further comprising:
   sorting a plurality of user profiles by at least one communication trait of the plurality of communication traits; and
   receiving a group of recipients, the group of recipients including the first user, based upon a common communication trait;
   wherein the received electronic communication to the first user is further to the selected group of recipients and the received electronic communication is based upon the common communication trait.

6. The method of claim wherein the effectiveness of the electronic communication is enhanced by incorporating at least one support term in the electronic communication.

7. A system for electronic interpersonal communication, the system comprising:
- a sender workstation;
- a communication network communicatively connecting the sender workstation to a receiver workstation;
- a storage medium storing a plurality of user profiles, each user profile comprising a plurality of communication traits including at least one rule of engagement, wherein the at least one rule of engagement comprises an instruction selected by a user defining a preferred manner to convey messages to the user, at least one support term, wherein the at least one support term comprises a word or phrase selected by the user as being motivational in communication with the user, and at least one expectation, wherein the at least one expectation is a word or phrase selected by the user as expressing how the user wants to collaborate;
- a microprocessor operating computer readable code, such that the microprocessor causes the sender workstation to receive a selection of a recipient, receive an identification of the selected recipient, and access a user profile of the selected recipient on the storage medium; and
- a graphical display operated by the microprocessor and associated with the sender workstation, the graphical display presents the user profile of the selected recipient, including the plurality of communication traits including the at least one rule of engagement the at least one support term, and the at least one expectation, and provides an electronic communication interface concurrently with the plurality of communication traits;
- wherein the electronic communication interface receives an electronic communication to the selected recipient, an effectiveness of the electronic communication to the selected recipient is enhanced by incorporating at least one of the at least one rule of engagement, the at least one support term, and the at least one expectation from the user profile of the selected recipient into the electronic communication, and the electronic communication is provided from the sender workstation to the receiver workstation across the communication network, the receiver workstation associated with the selected recipient.

8. The system of claim 7, wherein the sender workstation comprises the microprocessor and the graphical display.

9. The system of claim 7, wherein the receiver workstation receives a selected at least one rule of engagement from a first user, receives a selected at least one support term from the first user, receives a selected at least one expectation from the first user, and creates a user profile of the plurality of user profiles for the first user.

10. The system of claim 9, wherein the receiver workstation presents a plurality of user motivations, receives at least one selected user motivation from the first user, identifies a motivation group from the at least one selected user motivation, presents a plurality of rules of engagement based upon the identified motivation group, and presents a plurality of user expectations; and
- wherein the selected at least one rule of engagement is selected from the presented plurality of rules of engagement, the selected at least one support term is selected from the presented plurality of support terms, and the selected at least one expectation is selected from the presented plurality of expectations.

11. The system of claim 10, wherein the plurality of user profiles are organized in a database stored on the storage medium and the microprocessor is operable to sort the plurality of user profiles based upon one or more communication traits, and select a recipient group comprising the selected recipient from the plurality of user profiles based upon the one or more communication traits and the system sends the electronic communication to the recipient group.

12. The system of claim 7, wherein the effectiveness of the electronic communication is enhanced by incorporating at least one support term in the electronic communication.

13. A method, of electronic interpersonal communication from a sender to a group of recipients, the method comprising:
- providing a plurality of user profiles to the sender, wherein each user profile of the plurality is created by:
  - presenting a user with a plurality of user motivations;
  - receiving a selection of at least one user motivation of the plurality of user motivations from the user;
  - identifying a motivation group from the selected at least one motivation;
  - presenting a plurality of rules of engagement based upon the identified motivation group;
  - receiving a selection of at least one rule of engagement of the plurality of rules of engagement from the user;
  - presenting a plurality of support terms based upon the at least one user motivation;
  - receiving a selection of at least one user support term of the plurality of support terms from the user;
  - presenting a plurality of user expectations based upon the at least one support term;
  - receiving a selection of at least one user expectation of the plurality of user expectations from the user; and
  - creating the user profile comprising the at least one rule of engagement, the at least one user support term, and the at least one user expectation;
- sorting a plurality of user profiles by at least one of the at least one rule of engagement, the at least one user support term, and the at least one user expectation;
- receiving the group of recipients from the plurality of user profiles, each of the user profiles of the plurality of user profiles in the group of recipients having at least one common communication trait from the at least one rule of engagement, the at least one user support term, and the at least one user expectation;
- accessing the user profiles for the group of recipients;
- presenting on a graphical display the at least one common communication trait from the at least one rule of engagement, the at least one user support term, and the at least one user expectation of the user profiles of the group of recipients;
- receiving, at an electronic communication interface presented on the graphical display concurrently with the at least one common communication trait, an electronic communication from the sender to the group of recipients;
- enhancing an effectiveness of the electronic communication to the group of recipients by incorporating at least one common communication trait of the group of recipients comprising at least one of the at least one rule of engagement, the at least one user support term, and the at least one user expectation in the electronic communication; and
- sending the electronic communication to the group of recipients;
- wherein the at least one support term comprises a word or phrase selected by the user as being a motivational word or phrase, the at least one expectation comprises a word or phrase selected by the user as expressing how the recipient wants to collaborate, and the at least one rule of engagement comprises an instruction selected by the user defining how to convey messages to the user.

14. The method of claim 13 wherein the received electronic communication is a standardized base message, and the standardized base message is enhanced for communication to different recipient groups by incorporating at least one common communication trait a recipient group to receive the electronic communication.

15. The method of claim 13 further comprising grouping user profiles of the plurality of user profiles according to the identified motivation group for each user profile.

16. The method of claim 13, wherein the effectiveness of the electronic communication is enhanced by incorporating at least one support term in the electronic communication.

* * * * *

UNITED STATES PATENT AND TRADEMARK OFFICE
CERTIFICATE OF CORRECTION

PATENT NO. : 9,245,258 B2
APPLICATION NO. : 13/593222
DATED : January 26, 2016
INVENTOR(S) : Joseph M. Kiedinger It is certified that error appears in the above-identified patent and that said Letters Patent is hereby corrected as shown below:

Claims
In claim 6, at column 12, line 65, the dependency from claim 1 is missing between the words "claim" and "wherein".

Signed and Sealed this
Third Day of May, 2016

Michelle K. Lee
*Director of the United States Patent and Trademark Office*